(12) United States Patent
Imanishi (10) Patent No.: US 12,341,376 B2
(45) Date of Patent: Jun. 24, 2025

(54) MODULAR UNINTERRUPTIBLE POWER SUPPLY APPARATUS AND UNINTERRUPTIBLE POWER SUPPLY SYSTEM

(71) Applicant: TOSHIBA MITSUBISHI-ELECTRIC INDUSTRIAL SYSTEMS CORPORATION, Tokyo (JP)

(72) Inventor: Ryogo Imanishi, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 18/259,717

(22) PCT Filed: Nov. 17, 2021

(86) PCT No.: PCT/JP2021/042184
§ 371 (c)(1),
(2) Date: Jun. 28, 2023

(87) PCT Pub. No.: WO2023/089683
PCT Pub. Date: May 25, 2023

(65) Prior Publication Data
US 2024/0055889 A1    Feb. 15, 2024

(51) Int. Cl.
*H02J 9/06*    (2006.01)
*H02M 1/00*    (2007.01)

(52) U.S. Cl.
CPC ............ *H02J 9/062* (2013.01); *H02M 1/0009* (2021.05)

(58) Field of Classification Search
CPC .......... H02J 9/062; H02J 9/06; H02M 1/0009; H02M 7/493; H02M 1/325; H02M 5/458; G01R 15/18
See application file for complete search history.

(56) References Cited

U.S. PATENT DOCUMENTS

2013/0050880 A1*   2/2013  Rozman ................. H02H 3/025
                                                         361/18
2016/0126863 A1    5/2016  Ayai et al.
(Continued)

FOREIGN PATENT DOCUMENTS

JP          7-135777 A      5/1995
WO   WO 2014/199796 A1    12/2014
(Continued)

OTHER PUBLICATIONS

International Search Report issued Dec. 14, 2021 in PCT/JP2021/042184 filed on Nov. 17, 2021 2 pages.
(Continued)

*Primary Examiner* — Lincoln D Donovan
*Assistant Examiner* — Alex W Lam
(74) *Attorney, Agent, or Firm* — Oblon, McClelland, Maier & Neustadt, L.L.P.

(57) ABSTRACT

A first current detector detects an output current of a modular uninterruptible power supply apparatus. Each of a plurality of power conversion modules includes a resistive element and a second switch. The second switch connects the first current detector and the resistive element in parallel in an ON state. Each of first control circuits turns on the second switch when setting a corresponding power conversion module to an operating state, and turns off the second switch when setting the power conversion module to a stopped state. Each of the first control circuits detects a shared current of the corresponding power conversion module based on a current flowing through the resistive element when the second switch is in the ON state. Each of the first control circuits controls a power converter such that an output current of the power conversion module matches the shared current.

7 Claims, 6 Drawing Sheets

(56) References Cited

U.S. PATENT DOCUMENTS

2018/0152046 A1\* 5/2018 Toyoda ................. H02J 9/062
2020/0177021 A1 6/2020 Abe

FOREIGN PATENT DOCUMENTS

WO     WO 2017/009998 A1     1/2017
WO     WO 2019/003332 A1     1/2019

OTHER PUBLICATIONS

Japanese Office Action issued Aug. 22, 2023 in Japanese Patent Application No. 2022-544307 (with English Translation), 11 pages.
Written Opinion of the International Searching Authority issued on Dec. 14, 2021 in PCT/JP2021/042184 filed on Nov. 17, 2021 (with English translation), 11 pages.

\* cited by examiner

MODULAR UNINTERRUPTIBLE POWER SUPPLY APPARATUS AND UNINTERRUPTIBLE POWER SUPPLY SYSTEM

TECHNICAL FIELD

The present disclosure relates to a modular uninterruptible power supply apparatus and an uninterruptible power supply system.

BACKGROUND ART

A configuration employing a modular uninterruptible power supply apparatus that achieves redundancy on a module-by-module basis has been proposed for a single uninterruptible power supply apparatus. The modular uninterruptible power supply apparatus includes a plurality of power conversion modules (hereinafter also referred to as "power modules") connected in parallel, to thereby have a parallel circuit of the power modules in the apparatus (see, for example, WO 2017/009998 (PTL 1)).

The modular uninterruptible power supply apparatus is configured to allow some power modules to be stopped, and these power modules to be removed and inserted, during the operation of the uninterruptible power supply apparatus. Therefore, when a power module fails or is inspected, the power module can be replaced while power feed by the uninterruptible power supply apparatus is continued.

CITATION LIST

Patent Literature

PTL 1: WO 2017/009998

SUMMARY OF INVENTION

Technical Problem

In a modular uninterruptible power supply apparatus, power modules in the number required to supply a load current are selected and set to an operating state. Each of the power modules set to the operating state is configured to supply a shared current, which is an equally shared portion of the load current, to a load.

In the uninterruptible power supply apparatus described in PTL 1, a control unit of a bypass module is configured to determine a shared current by dividing a load current detected by a current detector by the number of operating power modules, and to transmit a current command value according to the shared current to a control unit of each power module. The control unit of each power module controls an inverter contained in the power module such that there is no deviation between an output current of the power module and the current command value.

However, since the number of operating power modules varies when some power modules stop operation during the operation of the modular uninterruptible power supply apparatus, the control unit of the bypass module is required to constantly monitor the operating condition of each power module in order to calculate the shared current. There is a concern that, as the number of power modules included in the modular uninterruptible power supply apparatus increases, it may become difficult to grasp the number of operating power modules.

The present disclosure has been made to solve the problem as described above, and an object thereof is to make it possible to easily detect a current which should be shared by operating power modules in a modular uninterruptible power supply apparatus.

Solution to Problem

A modular uninterruptible power supply apparatus in accordance with an aspect of the present disclosure includes an input terminal, an output terminal, a plurality of power conversion modules, a first current detector, and a plurality of first control circuits. The input terminal receives AC power supplied from an AC power supply. The output terminal is connected to a load. The plurality of power conversion modules are connected in parallel between the input terminal and the output terminal. The first current detector detects an AC current outputted from the output terminal. The plurality of first control circuits are provided respectively corresponding to the plurality of power conversion modules. Each of the power conversion modules includes a power converter, a first switch, a resistive element, and a second switch. The first switch is connected in series with the power converter between the input terminal and the output terminal. The second switch connects the first current detector and the resistive element in parallel in an ON state. Each of the first control circuits is configured to turn on the first switch and the second switch when setting a corresponding power conversion module to an operating state, and to turn off the first switch and the second switch when setting the power conversion module to a stopped state. Each of the first control circuits detects a shared current of the corresponding power conversion module based on a current flowing through the resistive element when the second switch is in the ON state. Each of the first control circuits controls the power converter such that an output current of the power conversion module matches the shared current.

Advantageous Effects of Invention

According to the present disclosure, it becomes possible to easily detect a current which should be shared by operating power modules in a modular uninterruptible power supply apparatus.

DESCRIPTION OF EMBODIMENTS

Hereinafter, an embodiment of the present disclosure will be described in detail with reference to the drawings. It should be noted that identical or corresponding parts in the drawings will be designated by the same reference numerals, and the description thereof will not be repeated in principle.

<Configuration of Uninterruptible Power Supply System>

Figure 1:
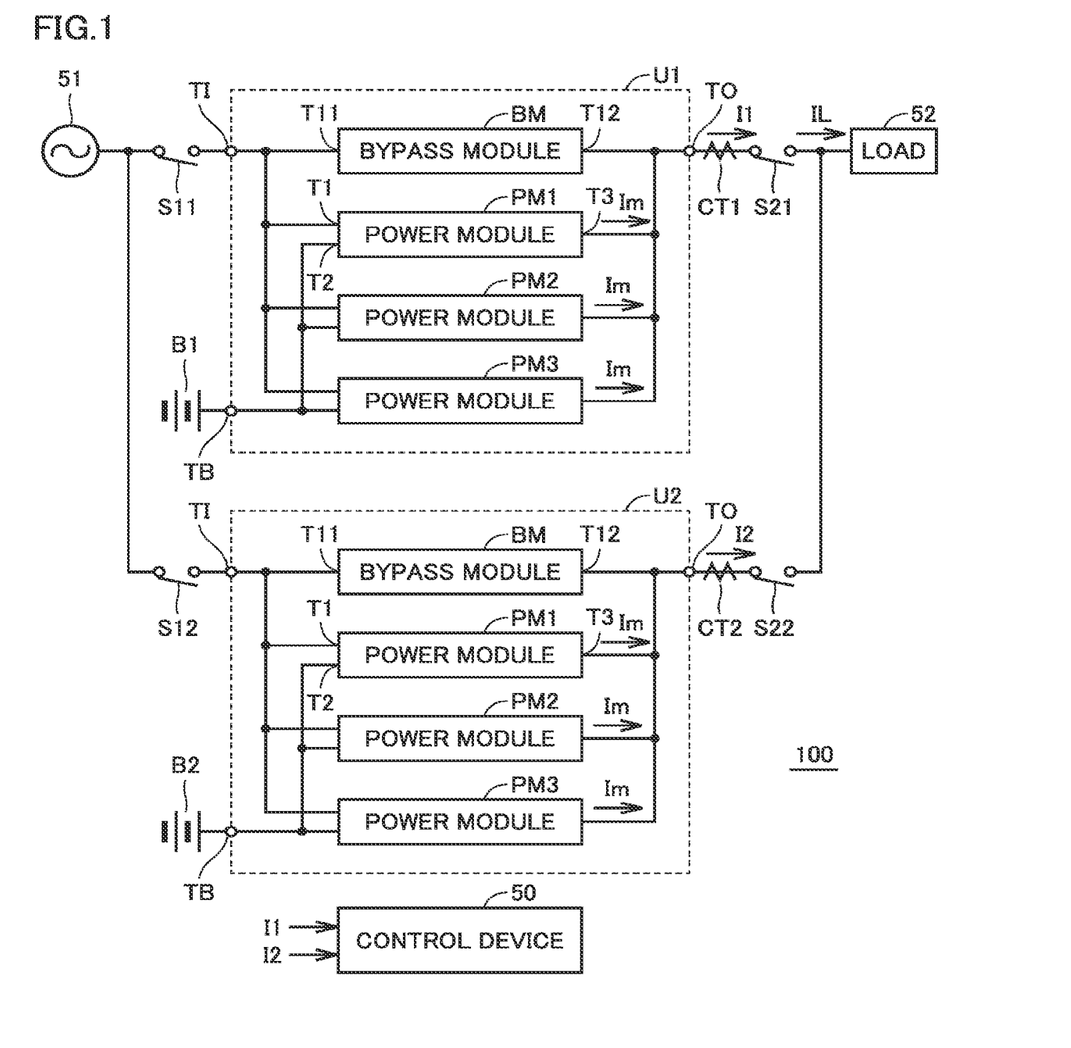
FIG. 1 is a circuit block diagram showing a configuration of an uninterruptible power supply system in accordance with an embodiment.

FIG. 1 is a circuit block diagram showing a configuration of an uninterruptible power supply system in accordance with an embodiment.

Referring to FIG. 1, an uninterruptible power supply system 100 in accordance with the present embodiment is connected between an AC power supply 51 and a load 52, and is configured to supply AC power to load 52. Although uninterruptible power supply system 100 actually receives three-phase AC power from AC power supply 51, FIG. 1 shows only a portion involved in one phase, for simplification of the drawing and the description.

Uninterruptible power supply system 100 includes a plurality of uninterruptible power supply apparatuses U1 and U2, a plurality of switches S11, S12, S21, and S22, a plurality of current detectors CT1 and CT2, and a control device 50. Although uninterruptible power supply system 100 includes two uninterruptible power supply apparatuses U1 and U2 in FIG. 1, the number of uninterruptible power supply apparatuses may be three or more. In the following description, uninterruptible power supply apparatuses U1 and U2 may be collectively referred to as "uninterruptible power supply apparatuses U", and batteries B1 and B2 may be collectively referred to as "batteries B".

Uninterruptible power supply apparatus U includes an input terminal TI, a battery terminal TB, and an output terminal TO. Input terminal TI receives the AC power with a commercial frequency from AC power supply 51. Battery terminals TB of uninterruptible power supply apparatuses U1 and U2 are connected to batteries B1 and B2, respectively. Battery B stores DC power. Battery B corresponds to one embodiment of a "power storage device". Instead of battery B, a capacitor may be connected to battery terminal TB.

Output terminal TO is connected to load 52. Load 52 is driven by the AC power. Uninterruptible power supply apparatuses U1 and U2 are connected in parallel with respect to load 52. Of the plurality of uninterruptible power supply apparatuses U1 and U2, only uninterruptible power supply apparatus U in an appropriate operating number required for the operation of load 52 is set to an operating state, and remaining uninterruptible power supply apparatus U is set to a stopped state.

Switches S11 and S12 have first terminals connected to AC power supply 51, and second terminals connected to input terminals TI of uninterruptible power supply apparatuses U1 and U2, respectively. Each of switches S11 and S12 is turned on when corresponding uninterruptible power supply apparatus U is used, and is turned off, for example, during maintenance of corresponding uninterruptible power supply apparatus U.

Switches S21 and S22 have first terminals connected to output terminals TO of uninterruptible power supply apparatuses U1 and U2, respectively, and second terminals connected to load 52. Each of switches S21 and S22 is turned on when corresponding uninterruptible power supply apparatus U is set to the operating state, and is turned off when corresponding uninterruptible power supply apparatus U is set to the stopped state. Switches S21 and S22 correspond to one embodiment of a "third switch".

In a normal state where the AC power is supplied from AC power supply 51, uninterruptible power supply apparatus U converts the AC power from AC power supply 51 into DC power, and supplies the DC power to battery B, and also converts the DC power into AC power and supplies the AC power to load 52. Further, in a power failure state where supply of the AC power from AC power supply 51 is stopped, uninterruptible power supply apparatus U converts the DC power from battery B into AC power and supplies the AC power to load 52.

The plurality of current detectors CT1 and CT2 are provided respectively corresponding to the plurality of uninterruptible power supply apparatuses U1 and U2. Current detector CT1 is provided between output terminal TO of uninterruptible power supply apparatus U1 and the first terminal of switch S21. Current detector CT1 detects an instantaneous value of an AC current I1 outputted from output terminal TO, and provides a signal I1f indicating a detected value thereof to control device 50. AC current I1 corresponds to an output current of uninterruptible power supply apparatus U1.

Current detector CT2 is provided between output terminal TO of uninterruptible power supply apparatus U2 and the first terminal of switch S22. Current detector CT2 detects an instantaneous value of an AC current I2 outputted from output terminal TO, and provides a signal I2f indicating a detected value thereof to control device 50. AC current I2 corresponds to an output current of uninterruptible power supply apparatus U2. Current detectors CT1 and CT2 correspond to one embodiment of a "first current detector".

Based on the output signals of the plurality of current detectors CT1 and CT2, control device 50 determines a current that is the sum of output currents I1 and I2 of the plurality of uninterruptible power supply apparatuses U1 and U2, that is, a load current IL supplied from uninterruptible power supply system 100 to load 52. Control device 50 determines an appropriate number of operating uninterruptible power supply apparatuses U required to supply load current IL. Further, control device 50 compares the determined appropriate number of operating uninterruptible power supply apparatuses U with a number of currently operating uninterruptible power supply apparatuses U, and based on the comparison result, determines whether to set each uninterruptible power supply apparatus U to the stopped state or the operating state.

When control device 50 sets uninterruptible power supply apparatus U1 to the stopped state, control device 50 turns off switch S21 to disconnect uninterruptible power supply apparatus U1 from load 52. On this occasion, control device 50 may additionally turn off switch S11 or stop the operation of uninterruptible power supply apparatus U1. Further, when control device 50 sets uninterruptible power supply apparatus U1 to the operating state, control device 50 maintains switches S11 and S21 in an ON state, and continues the operation of uninterruptible power supply apparatus U1.

When control device 50 sets uninterruptible power supply apparatus U2 to the stopped state, control device 50 turns off switch S22 to disconnect uninterruptible power supply apparatus U2 from load 52. On this occasion, control device 50 may additionally turn off switch S12 or stop the operation of uninterruptible power supply apparatus U2. Further, when control device 50 sets uninterruptible power supply apparatus U2 to the operating state, control device 50 maintains switches S12 and S22 in the ON state, and continues the operation of uninterruptible power supply apparatus U2.

Uninterruptible power supply apparatus U further includes a plurality of power modules PM1 to PM3 and a bypass module BM. Although uninterruptible power supply apparatus U includes three power modules PM1 to PM3 in FIG. 1, the number of power modules may be two, or may be four or more. Each of power modules PM1 to PM3 is a power conversion module having a power converter. In the following description, power modules PM1 to PM3 may be collectively referred to as "power modules PM".

Power module PM has an input terminal T1, a battery terminal T2, and an output terminal T3. Bypass module BM has an input terminal T11, an output terminal T12, and a bypass switch not shown. The bypass switch is connected between input terminal T11 and output terminal T12.

Input terminals T1 of power modules PM1 to PM3 and input terminal T11 of bypass module BM are all connected to input terminal TI. Battery terminals T2 of power modules PM1 to PM3 are all connected to battery terminal TB. Output terminals T3 of power modules PM1 to PM3 and output terminal T12 of bypass module BM are all connected to output terminal TO. That is, in each uninterruptible power supply apparatus U, power modules PM1 to PM3 and bypass module BM are connected in parallel between input terminal TI and output terminal TO.

Such uninterruptible power supply apparatus U is referred to as a "modular uninterruptible power supply apparatus". A modular uninterruptible power supply apparatus has an internal parallel circuit of power modules in the number corresponding to the capacity of the uninterruptible power supply apparatus. When N power modules are required for power supply by the uninterruptible power supply apparatus, N+1 power modules are mounted to achieve redundancy, whereby the quality of the power supply can be improved.

A method for achieving redundancy on a module-by-module basis in a single uninterruptible power supply apparatus in this manner is also referred to as a "hot swap method." The hot swap method means a structure that allows some power modules to be stopped, and these power modules to be removed and inserted, during the operation of the uninterruptible power supply apparatus. According to this method, when a power module fails or is inspected, the power module can be replaced while power feed by the uninterruptible power supply apparatus is continued.

Uninterruptible power supply apparatus U has an inverter power feed mode and a bypass power feed mode. The inverter power feed mode is a mode in which AC power is supplied from at least one power module PM to load 52. The bypass power feed mode is a mode in which the AC power is supplied from AC power supply 51 to load 52 via bypass module BM.

In the inverter power feed mode, at least one power module PM is set to the operating state. Each power module PM uses the AC power supplied from AC power supply 51 to generate the AC power to be supplied to load 52. A current that is the sum of output currents Im of power modules PM set to the operating state is supplied to load 52 as the output current of uninterruptible power supply apparatus U.

In the example of FIG. 1, a current that is the sum of output currents Im of power modules PM set to the operating state in uninterruptible power supply apparatus U1 serves as output current I1 of uninterruptible power supply apparatus U1, and a current that is the sum of output currents Im of power modules PM set to the operating state in uninterruptible power supply apparatus U2 serves as output current I2 of uninterruptible power supply apparatus U2. Then, a current that is the sum of output current I1 of uninterruptible power supply apparatus U1 and output current I2 of uninterruptible power supply apparatus U2 serves as load current IL. In other words, load current IL is shared among the plurality of power modules PM set to the operating state in each of uninterruptible power supply apparatuses U1 and U2.

When output currents Im vary among the plurality of power modules PM operating in parallel in uninterruptible power supply system 100, there may occur a phenomenon in which power flows among the plurality of power modules PM (that is, a cross current). Therefore, it is required to equally share load current IL among the plurality of power modules PM operating in parallel.

Here, as a technique of determining a shared current of each power module PM, a conceivable method is to calculate a shared current by dividing load current IL by the number of operating power modules PM, by applying the technique described in PTL 1. However, when this technique is applied to uninterruptible power supply system 100 in accordance with the present embodiment, it is necessary to grasp the number of operating power modules PM for each of the plurality of uninterruptible power supply apparatuses U. During the operation of uninterruptible power supply system 100, in each uninterruptible power supply apparatus U, the hot swap method allows operation of some power modules PM to be stopped as appropriate. Accordingly, in order to grasp the number of operating power modules PM in each uninterruptible power supply apparatus U, it is required to constantly monitor the operating condition of each uninterruptible power supply apparatus U. There is a concern that, as the number of uninterruptible power supply apparatuses U increases, and/or as the number of power modules PM included in each uninterruptible power supply apparatus U increases, it may become difficult to accurately grasp the number of operating power modules PM.

The present embodiment proposes a configuration that can easily detect a current which should be shared by operating power modules PM in modular uninterruptible power supply apparatus U. In particular, the present embodiment proposes a configuration that can easily detect a current which should be shared by operating power modules PM in uninterruptible power supply system 100 in which a plurality of modular uninterruptible power supply apparatuses U are connected in parallel with respect to load 52.

<Configuration of Uninterruptible Power Supply Apparatus>

Figure 2:
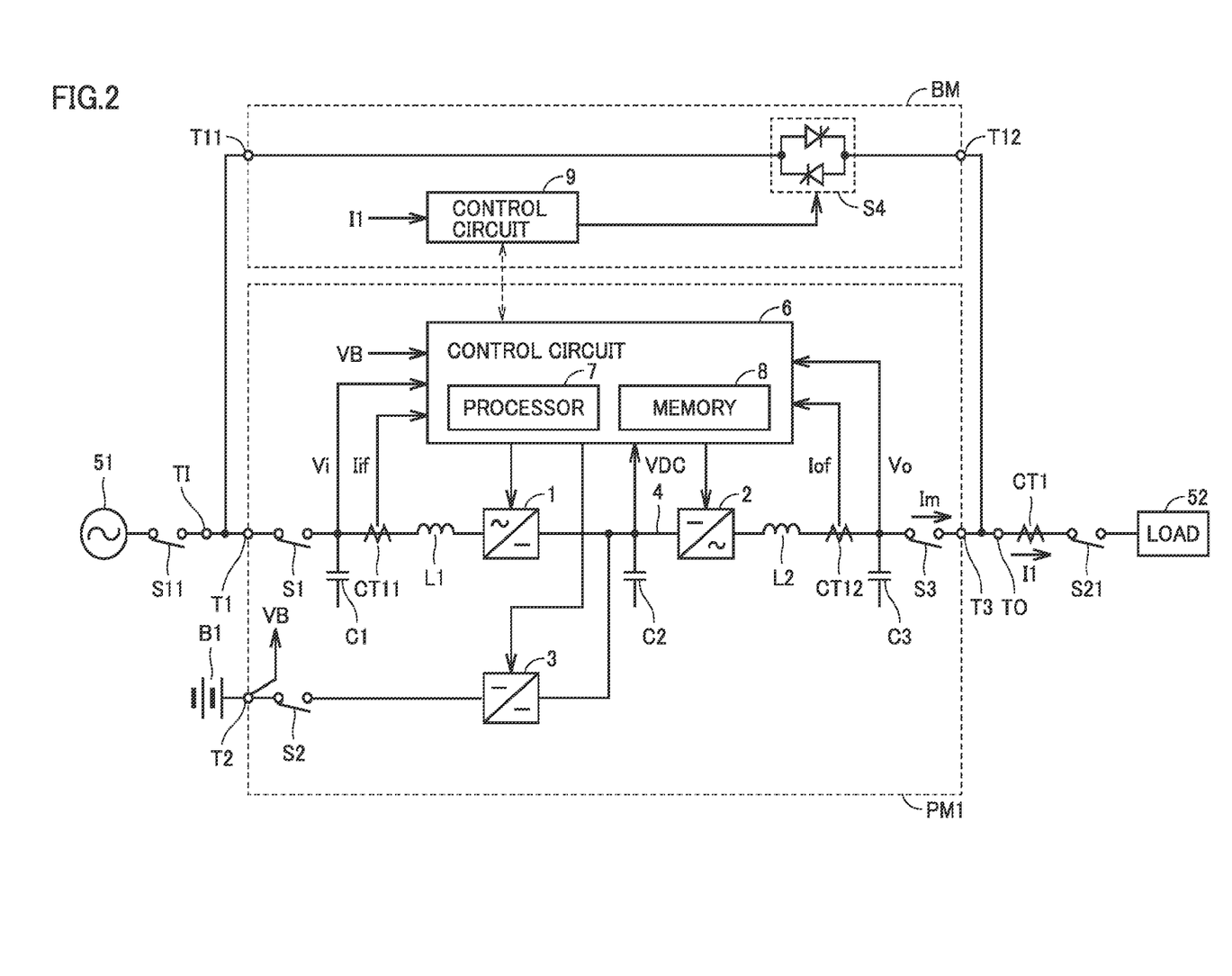
FIG. 2 is a circuit block diagram showing a configuration of an uninterruptible power supply apparatus shown in FIG. 1.

FIG. 2 is a circuit block diagram showing a configuration of uninterruptible power supply apparatus U shown in FIG. 1. FIG. 2 representatively shows a configuration of uninterruptible power supply apparatus U1.

Referring to FIG. 2, bypass module BM includes a switch S4 and a control circuit 9. Switch S4 is connected between input terminal T11 and output terminal T12. Switch S4 is, for example, a thyristor switch having a pair of thyristors connected in anti-parallel. Switch S4 is controlled by control circuit 9. Switch S4 is turned off in the inverter power feed mode, and is turned on in the bypass power feed mode.

Control circuit 9 is connected to control device 50 and a control circuit 6 included in each of power modules PM1 to PM3, with each other, by communication lines (not shown). Control circuit 9 transmits and receives information to and from control device 50 and each control circuit 6 via the communication lines. It should be noted that communication among control circuit 9, control circuit 6, and control device 50 may be implemented as either wireless or wired communication.

Control circuit 9 can obtain information about the operating condition of each power module PM, by the communication with each control circuit 6. The information about the operating condition includes information indicating whether or not power module PM fails.

Control circuit 9 detects output current I1 of uninterruptible power supply apparatus U1 based on the output signal of current detector CT1, and determines a minimum number Nmin of operating power modules PM required to at least supply output current I1. Control circuit 9 adds a redundant number Nr of operating power modules PM (for example, one) to determined minimum number Nmin of operating power modules PM, to determine an appropriate number Ns of operating power modules PM.

By operating power modules PM in appropriate operating number Ns, which was determined by adding redundant number Nr of operating power modules PM to minimum number Nmin of operating power modules PM in this manner, when one power module PM fails, failed power module PM can be replaced while power feed to load 52 is continued by power modules PM in minimum operating number Nmin.

Further, control circuit 9 determines a number Nc of currently operating power modules PM, by the communication with each control circuit 6. Control circuit 9 compares appropriate number Ns of operating power modules PM with number Nc of currently operating power modules PM, and based on the comparison result and the information about the operating condition of each power module PM, determines whether to set each power module PM to the stopped state or the operating state. Control circuit 9 provides a signal indicating the determination result to control circuit 6.

Control circuit 9 can be configured by a microcomputer or the like, for example. As an example, control circuit 9 contains a CPU (Central Processing Unit) and a memory which are not shown, and can perform control operations described later by software processing in which the CPU executes a program prestored in the memory. Alternatively, some or all of the control operations can be implemented by hardware processing using built-in dedicated electronic circuitry and the like, instead of by the software processing. Control circuit 9 corresponds to one embodiment of a "second control circuit".

In addition to input terminal T1, battery terminal T2 and output terminal T3, power module PM has switches S1 to S3, capacitors C1, C2, and C3, reactors L1 and L2, a DC line 4, a converter 1, an inverter 2, a bidirectional chopper 3, current detectors CT11 and CT12, and control circuit 6.

Input terminal T1 receives an AC input voltage Vi with the commercial frequency from AC power supply 51, via switch S11 and input terminal TI. An instantaneous value of AC input voltage Vi with the commercial frequency supplied from AC power supply 51 (a voltage of input terminal T1) is detected by control circuit 6. For example, when AC input voltage Vi is higher than a lower limit value, control circuit 6 determines that AC input voltage Vi is normally supplied from AC power supply 51, and when AC input voltage Vi is lower than the lower limit value, control circuit 6 determines that a power failure of AC power supply 51 has occurred. Further, control circuit 6 controls converter 1 and inverter 2 in synchronization with AC input voltage Vi.

Switch S1 has a first terminal connected to input terminal T1, and a second terminal connected to an input node of converter 1 via reactor L1. Capacitor C1 is connected to the second terminal of switch S1. Switch S1 is turned on when power module PM is used, and is turned off, for example, during maintenance of power module PM.

Capacitor C1 and reactor L1 constitute an AC filter. The AC filter is a low pass filter, allows an AC current with the commercial frequency to flow from AC power supply 51 to converter 1, and prevents a signal with a switching frequency generated at converter 1 from flowing toward AC power supply 51.

Current detector CT11 detects an instantaneous value of a current Ii flowing into power module PM from AC power supply 51 via input terminal T1, and provides a signal Iif indicating a detected value thereof to control circuit 6.

Converter 1 is controlled by control circuit 6, and converts the AC power supplied from AC power supply 51 into DC power and outputs the DC power to DC line 4 in the normal state where the AC power is supplied normally from AC power supply 51. The operation of converter 1 is stopped in the power failure state where supply of the AC power from AC power supply 51 is stopped.

DC line 4 is connected to converter 1, bidirectional chopper 3, and inverter 2. A DC voltage VDC appearing on DC line 4 is detected by control circuit 6. In the normal state, control circuit 6 controls converter 1 such that DC voltage VDC to be outputted from converter 1 matches a reference DC voltage VDCr.

Capacitor C2 is connected to DC line 4, and smooths and stabilizes DC voltage VDC on DC line 4. Bidirectional chopper 3 has a high-voltage side node connected to DC line 4, and a low-voltage side node connected to battery terminal T2 via switch S2.

Bidirectional chopper 3 is controlled by control circuit 6. In the normal state, bidirectional chopper 3 stores the DC power generated by converter 1 in battery B. At the time of a power failure of AC power supply 51, bidirectional chopper 3 supplies the DC power of battery B to inverter 2.

Switch S2 is turned on when power module PM is used, and is turned off, for example, during maintenance of power module PM, or during maintenance of battery B.

An instantaneous value of a terminal-to-terminal voltage (battery voltage) VB of battery B is detected by control circuit 6. In the normal state, control circuit 6 controls bidirectional chopper 3 such that battery voltage VB matches a reference battery voltage VBr. At the time of a power failure of AC power supply 51, control circuit 6 controls bidirectional chopper 3 such that DC voltage VDC on DC line 4 matches reference DC voltage VDCr.

Inverter 2 is controlled by control circuit 6, and in the normal state, converts the DC power generated by converter 1 into AC power with the commercial frequency. At the time of a power failure of AC power supply 51, inverter 2 converts the DC power supplied from battery B via bidirectional chopper 3 into AC power with the commercial frequency.

Reactor L2 has a first terminal connected to an output node of inverter 2, and a second terminal connected to output terminal T3 via switch S3. Capacitor C3 is connected to the second terminal of reactor L2. Capacitor C3 and reactor L2 constitute an AC filter. The AC filter is a low pass filter, allows an AC current with the commercial frequency to flow from inverter 2 toward load 52, and prevents a signal with the switching frequency generated at inverter 2 from flowing toward load 52. In other words, the AC filter converts a rectangular wave voltage outputted from inverter 2 into a sinusoidal voltage.

An instantaneous value of an AC output voltage Vo appearing at the second terminal of reactor L2 is detected by control circuit 6. Current detector CT12 detects an output current Io of inverter 2, and provides a signal Iof indicating a detected value thereof to control circuit 6.

Switch S3 has a first terminal connected to the second terminal of reactor L2, and a second terminal connected to output terminal T3. Switch S3 is controlled by control circuit 6. When control circuit 6 sets corresponding power module PM to the stopped state, control circuit 6 turns off switch S3 to cut off power module PM from output terminal TO. On this occasion, control circuit 6 may additionally turn off switch S1 or stop the operation of power module PM. Further, when control circuit 6 sets corresponding power module PM to the operating state, control circuit 6 maintains switches S1 and S3 in the ON state, and continues the operation of power module PM. Switch S3 corresponds to one embodiment of a "first switch".

Control circuit 6 can be configured by a microcomputer or the like, for example. As an example, control circuit 6 contains a processor 7 and a memory 8, and can perform control operations described later by software processing in which processor 7 executes a program prestored in memory 8. Alternatively, some or all of the control operations can be implemented by hardware processing using built-in dedicated electronic circuitry and the like, instead of by the software processing. Control circuit 6 corresponds to one embodiment of a "first control circuit".

<Control Configuration of Uninterruptible Power Supply System>

Figure 3:
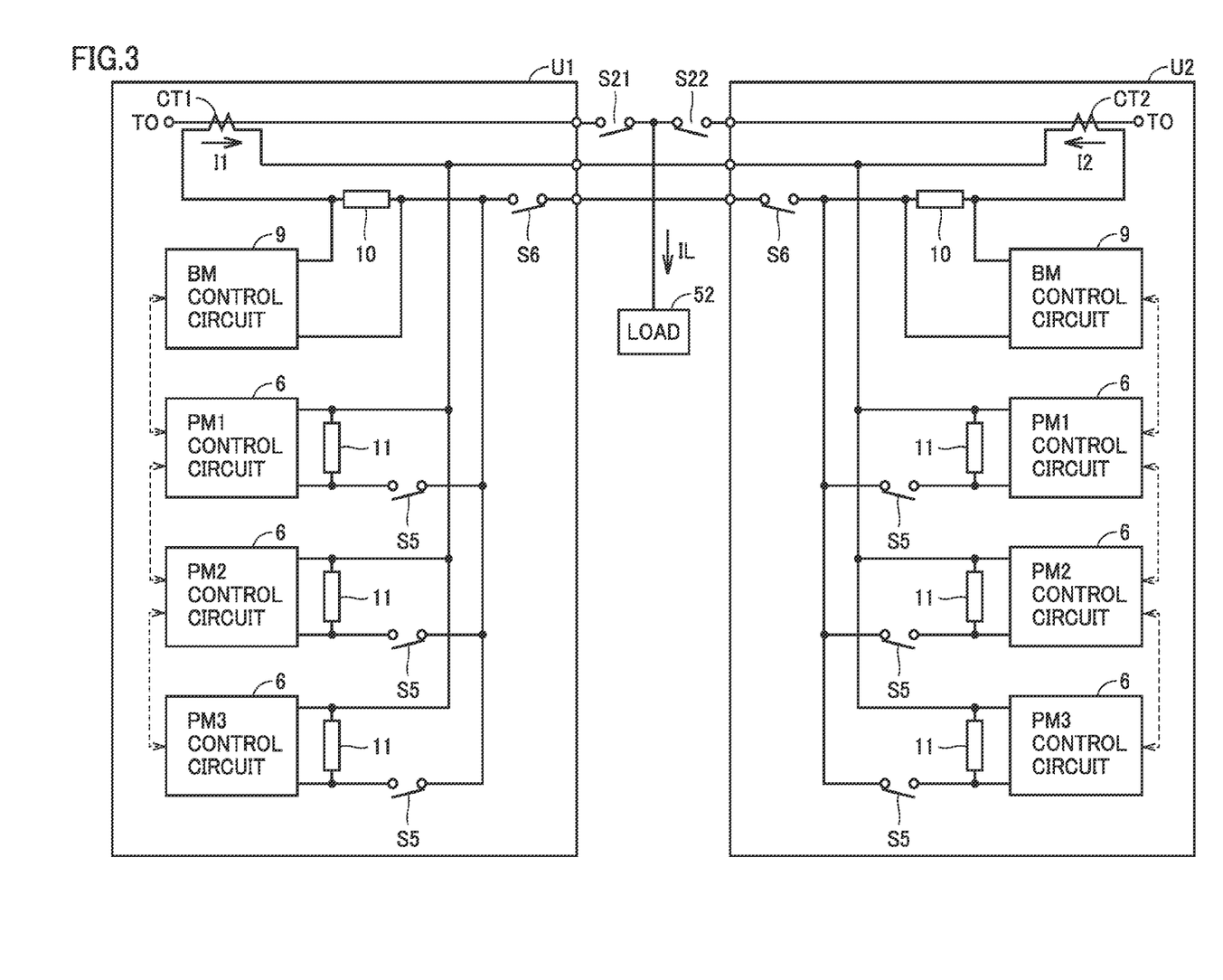
FIG. 3 is a diagram showing a control configuration in the uninterruptible power supply system.

FIG. 3 is a diagram showing a control configuration in uninterruptible power supply system 100. FIG. 3 shows a configuration of a portion involved in the control of the output currents of the plurality of power supply modules PM included in each uninterruptible power supply apparatus U.

As shown in FIG. 1, the plurality of uninterruptible power supply apparatuses U1 and U2 are connected in parallel with respect to load 52. FIG. 3 shows a control configuration of output current I1 of uninterruptible power supply apparatus U1 on the left side, and a control configuration of output current I2 of uninterruptible power supply apparatus U2 on the right side.

In each uninterruptible power supply apparatus U, control circuit 9 of bypass module BM and control circuits 6 of power modules PM1 to PM3 are connected with each other by the communication lines, to transmit and receive information to and from control circuit 9 and control circuits 6.

Current detector CT1 detects the instantaneous value of output current I1 of uninterruptible power supply apparatus U1. Current detector CT2 detects the instantaneous value of output current I2 of uninterruptible power supply apparatus U2. As each of current detectors CT1 and CT2, for example, a current transformer referred to as a CT is used. Although not shown, the current transformer is usually configured to include a primary winding, a secondary winding, and an iron core. The current transformer obtains a current flowing through a power line, by the primary winding wound around the iron core. When a primary current flows through the primary winding, a magnetic flux is induced in the iron core. In response to a change in the magnetic flux, a secondary current flows through the secondary winding wound around the iron core. The current transformer extracts the secondary current and converts it into a secondary terminal voltage at a secondary burden impedance connected to a secondary circuit. It should be noted that the secondary burden impedance is an impedance of a burden (a meter, a relay, a conducting wire, or the like) connected to the secondary circuit of the current transformer.

FIG. 3 shows a secondary burden impedance 10 for each of current detectors CT1 and CT2. In uninterruptible power supply apparatus U1, control circuit 9 detects output current I1 of uninterruptible power supply apparatus U1 based on the secondary current flowing through secondary burden impedance 10. Control circuit 9 determines appropriate number Ns of operating power modules PM using the detected value of output current I1, as described above. Further, control circuit 9 compares determined appropriate number Ns of operating power modules PM with number Nc of currently operating power modules PM, and based on the comparison result and the information about the operating condition of each power module PM, determines whether to set each power module PM to the stopped state or the operating state, and then provides a signal indicating the determination result to each control circuit 6.

In uninterruptible power supply apparatus U1, each power module PM has a resistive element 11 and a switch S5. Resistive element 11 is connected in parallel with current detector CT1 (the secondary winding). Switch S5 is connected between resistive element 11 and current detector CT1. When switch S5 is in the ON state, a parallel circuit of resistive element 11 and current detector CT1 is formed. By turning off switch S5, resistive element 11 is cut off from current detector CT1. Resistive element 11 corresponds to one embodiment of a "resistive element". Switch S5 corresponds to one embodiment of a "second switch".

In the example of FIG. 3, when switches S5 included in power modules PM1 to PM3 are all turned on in uninterruptible power supply apparatus U1, three resistive elements 11 are connected in parallel with respect to current detector CT1. It should be noted that three resistive elements 11 have resistance values equal to each other. When switch S5 included in any one of power modules PM1 to PM3 is turned off in this state, the number of resistive elements 11 connected in parallel to current detector CT1 decreases from three to two.

Each switch S5 is controlled by control circuit 6 of corresponding power module PM. Specifically, in each power module PM, control circuit 6 is configured to turn on switch S5 when it turns on switch S3, and to turn off switch S5 when it turns off switch S3.

Accordingly, when control circuit 6 sets corresponding power module PM to the stopped state, control circuit 6 turns off switch S3 and also turns off switch S5 to cut off resistive element 11 from current detector CT1. Further, when control circuit 6 sets corresponding power module PM to the operating state, control circuit 6 turns on switch S3 and also turns on switch S5 to connect resistive element 11 to current detector CT1. Therefore, the number of resistive elements 11 connected in parallel to current detector CT1 becomes equal to the number of power modules PM operating in parallel in uninterruptible power supply apparatus U1 (that is, number Nc of currently operating power modules PM).

Uninterruptible power supply apparatus U2 has the same control configuration as that of uninterruptible power supply apparatus U1 described above. Therefore, by turning off switch S5 corresponding to power module PM to be set to the stopped state, the number of resistive elements 11 connected in parallel to current detector CT2 becomes equal to the number of power modules PM operating in parallel in uninterruptible power supply apparatus U2 (that is, number Nc of currently operating power modules PM).

Each uninterruptible power supply apparatus U further includes a switch S6. Current detector CT1 (the secondary winding) and current detector CT2 (the secondary winding) are connected in parallel with each other via switches S6. Thereby, a parallel circuit of resistive elements 11 in uninterruptible power supply apparatus U1 and a parallel circuit of resistive elements 11 in uninterruptible power supply apparatus U2 are connected in parallel with each other. Switch S6 corresponds to one embodiment of a "fourth switch".

Switch S6 is provided to cut off the parallel circuit of resistive elements 11 in corresponding uninterruptible power supply apparatus U from the parallel circuit of resistive elements 11 in another uninterruptible power supply apparatus U. Switch S6 is controlled by control circuit 9, and is turned on when corresponding uninterruptible power supply apparatus U is set to the operating state, and is turned off when corresponding uninterruptible power supply apparatus U is set to the stopped state. That is, in uninterruptible power supply apparatus U1, switch S6 is turned on when switch S21 is turned on, and switch S6 is turned off when switch S21 is turned off. In uninterruptible power supply apparatus U2, switch S6 is turned on when switch S22 is turned on, and switch S6 is turned off when switch S22 is turned off.

Figure 4:
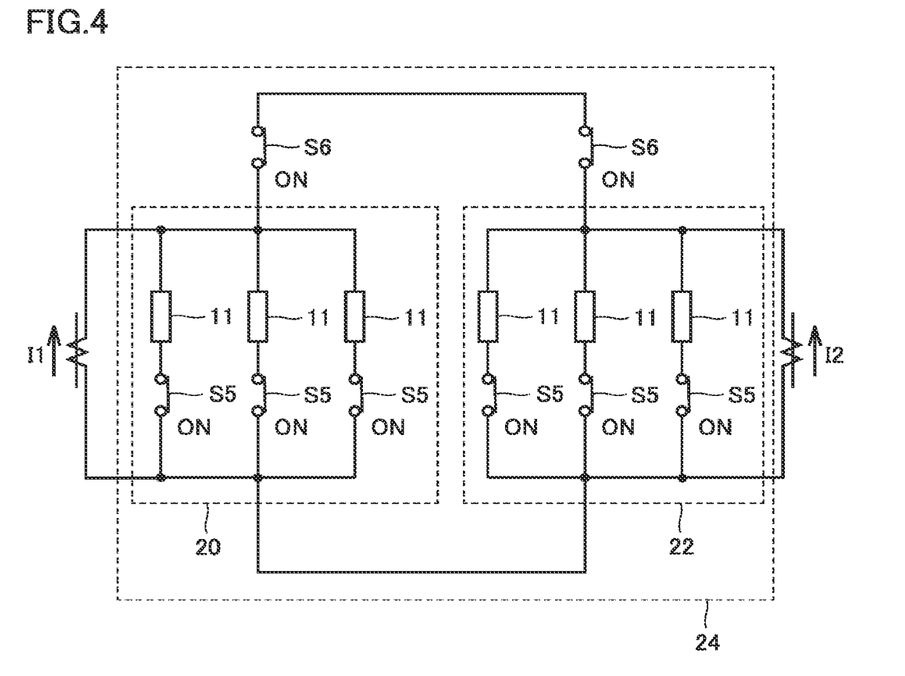
FIG. 4 is a diagram showing parallel circuits of resistive elements extracted from the control configuration shown in FIG. 3.

FIG. 4 is a diagram showing parallel circuits of resistive elements 11 extracted from the control configuration shown in FIG. 3.

Referring to FIG. 4, a parallel circuit 20 indicates a parallel circuit of resistive elements 11 formed in uninterruptible power supply apparatus U1. A parallel circuit 22 indicates a parallel circuit of resistive elements 11 formed in uninterruptible power supply apparatus U2.

The total number of resistive elements 11 included in each of parallel circuits 20 and 22 is equal to the total number of power modules PM included in corresponding uninterruptible power supply apparatus U. Switch S5 is connected in series with respect to each resistive element 11. The number of resistive elements 11 connected in parallel in each of parallel circuits 20 and 22 varies by turning on/off each switch S5. As described above, switch S5 is turned off when corresponding power module PM is set to the stopped state, and is turned on when corresponding power module PM is set to the operating state. The number of resistive elements 11 connected in parallel becomes equal to the number of power modules PM operating in parallel in corresponding uninterruptible power supply apparatus U (number Nc of currently operating power modules PM).

Further, parallel circuit 20 and parallel circuit 22 are connected in parallel with each other by switches S6. Switch S6 is turned on when corresponding uninterruptible power supply apparatus U is set to the operating state, and is turned off when corresponding uninterruptible power supply apparatus U is set to the stopped state, as described above.

In the example of FIG. 4, when three switches S5 are all turned on in each of parallel circuits 20 and 22, a parallel circuit 24 of a total of six resistive elements 11 is formed in entire uninterruptible power supply system 100. Since six resistive elements 11 have resistance values equal to each other, currents flowing through six resistive elements 11 also have values equal to each other.

A current corresponding to load current IL, which is the current that is the sum of output current I1 of uninterruptible power supply apparatus U1 and output current I2 of uninterruptible power supply apparatus U2, flows through parallel circuit 24. This current is equally divided into six resistive elements 11. Therefore, a current corresponding to one sixth of load current IL flows through each resistive element 11.

Turning back to FIG. 3, in each power module PM, control circuit 6 detects the current flowing through corresponding resistive element 11, and thereby detects a shared current ID of corresponding power module PM. Shared current ID is a current that should be equally shared by the plurality of power modules PM operating in parallel, and corresponds to a target value of output current Im of each power module PM. In the example of FIG. 4, each control circuit 6 detects shared current ID, which is equal to IL/6.

Figure 5:
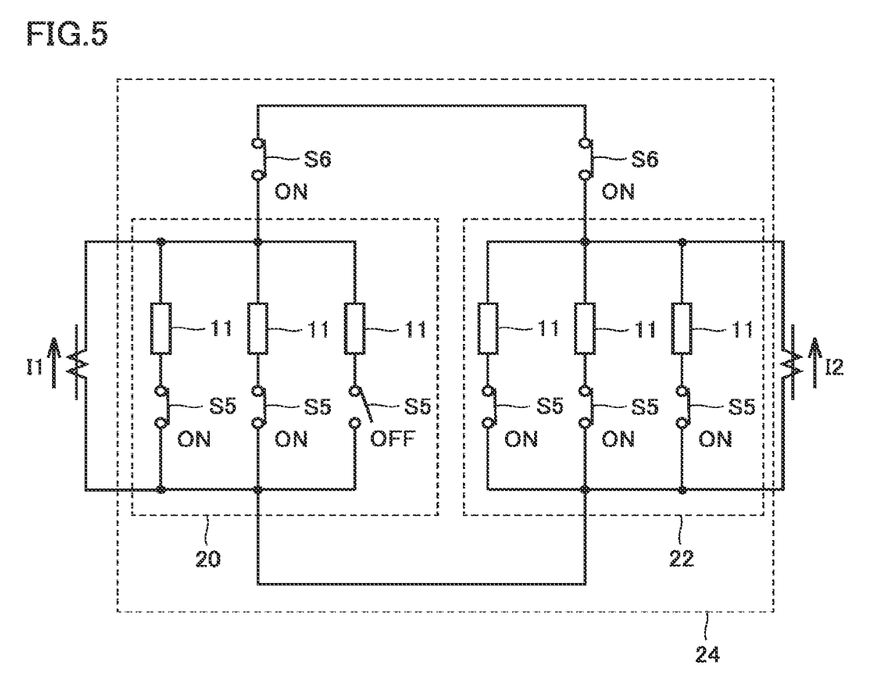
FIG. 5 is a diagram showing parallel circuits of resistive elements extracted from the control configuration shown in FIG. 3.

Here, it is assumed that at least one power module PM stops operation in any of uninterruptible power supply apparatuses U1 and U2. FIG. 5 shows a case where one power module PM stops operation in uninterruptible power supply apparatus U1.

As shown in FIG. 5, in parallel circuit 20, by turning off switch S5 corresponding to power module PM that stops operation, the number of resistive elements 11 connected in parallel decreases from three to two. Thus, in entire parallel circuit 24, the number of resistive elements 11 connected in parallel decreases from six to five.

In this case, the current flowing through parallel circuit 24 is equally divided into five resistive elements 11, and thus a current corresponding to one fifth of load current IL flows through each resistive element 11. Each control circuit 6 detects shared current ID, which is equal to IL/5, based on the current flowing through corresponding resistive element 11.

Figure 6:
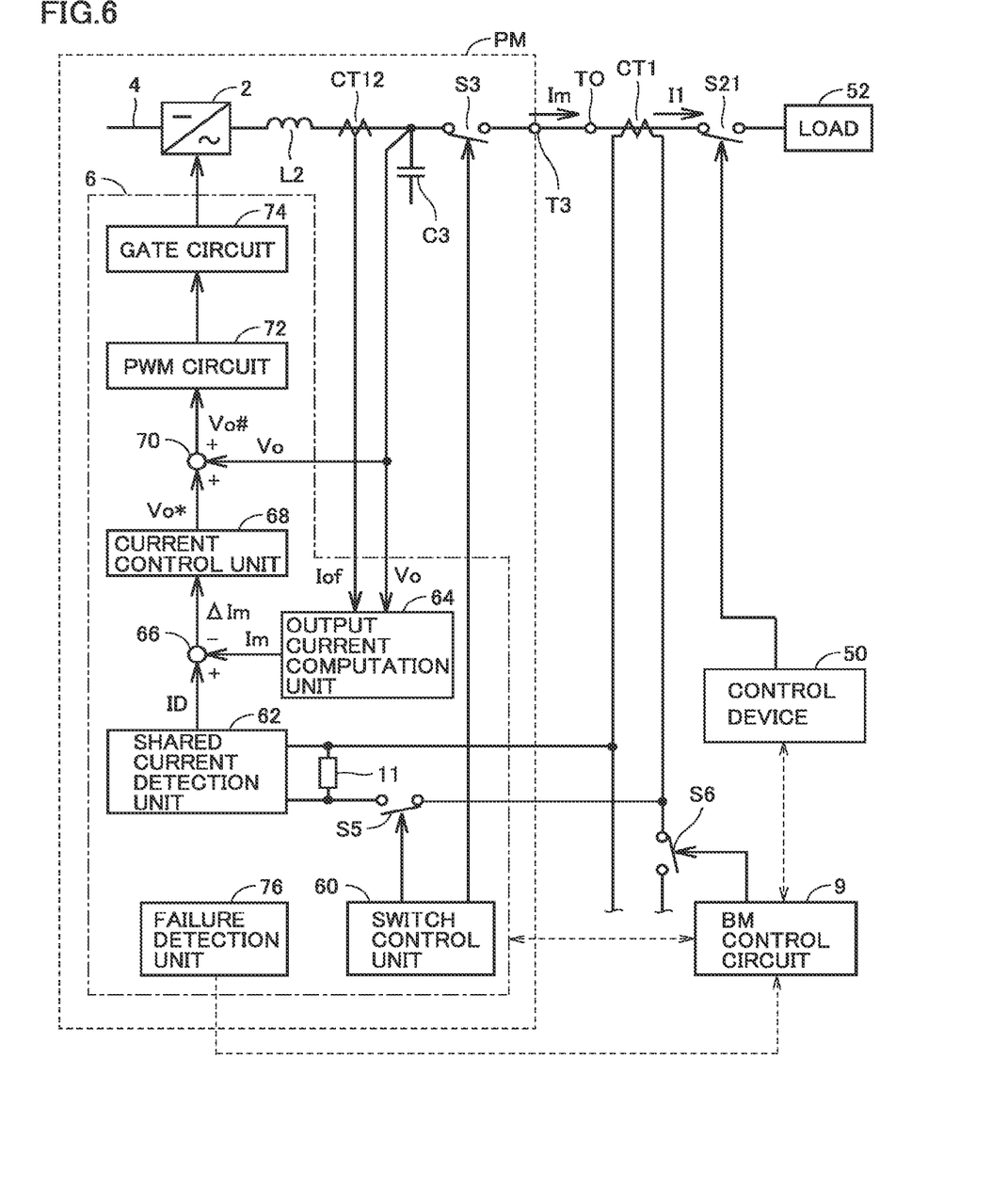
FIG. 6 is a diagram showing function configurations of a control circuit of each power module.

FIG. 6 is a diagram showing function configurations of control circuit 6 of each power module PM. FIG. 6 shows a portion involved in the control of inverter 2, of control circuit 6 of power module PM included in uninterruptible power supply apparatus U1.

As shown in FIG. 6, control circuit 6 includes a switch control unit 60, a shared current detection unit 62, an output current computation unit 64, a subtracter 66, a current control unit 68, an adder 70, a PWM (Pulse Width Modulation) circuit 72, a gate circuit 74, and a failure detection unit 76. These function configurations are implemented by processor 7 executing a predetermined program in control circuit 6 shown in FIG. 2.

Failure detection unit 76 detects whether or not power module PM fails. When power module PM fails, failure detection unit 76 outputs a failure detection signal to control circuit 9 of bypass module BM.

It should be noted that control circuit 9 of bypass module BM turns on switch S6 when switch S21 is turned on, and turns off switch S6 when switch S21 is turned off, by the communication with control device 50. Further, control circuit 9 obtains information about the operating condition of each power module PM, by the communication with each control circuit 6. The information about the operating condition includes the failure detection signal.

When switch S21 is in the ON state, control circuit 9 detects output current I1 of uninterruptible power supply apparatus U1 based on the output signal of current detector CT1, and determines appropriate number Ns of operating power modules PM for supplying output current I1. Further, control circuit 9 determines number Nc of currently operating power modules PM, by the communication with each control circuit 6. Control circuit 9 compares appropriate number Ns of operating power modules PM with number Nc of currently operating power modules PM, and based on the comparison result and the information about the operating condition of each power module PM, determines whether to set each power module PM to the stopped state or the operating state. Control circuit 9 provides a signal indicating the determination result to each control circuit 6.

In each control circuit 6, switch control unit 60 receives the signal indicating the determination result from control circuit 9 of bypass module BM. Based on the signal, switch control unit 60 controls turning on/off of switches S3 and S5. Specifically, when power module PM is set to the operating state, switch control unit 60 turns on switch S3 and also turn on switch S5. When power module PM is set to the stopped state, switch control unit 60 turns off switch S3 and also turn off switch S5.

Shared current detection unit 62 detects shared current ID of power module PM based on the current flowing through resistive element 11. Shared current detection unit 62 outputs detected shared current ID to subtracter 66.

Output current computation unit 64 calculates output current Im of power module PM, using output signal Iof of current detector CT12 and AC output voltage Vo. Specifically, output current computation unit 64 determines a current Ic flowing into capacitor C3, using a capacity C of capacitor C3 and AC output voltage Vo (Ic=C·dVo/dt). Then, output current computation unit 64 subtracts current Ic from output current Io of inverter 2 to calculate output current Im of power module PM. This eliminates a current detector for detecting output current Im of power module PM. Subtracter 66 determines a deviation ΔIm=ID−Im between shared current ID and output current Im of power module PM. Current control unit 68 generates a voltage command value Vo* such that deviation ΔIm becomes equal to zero. Current control unit 68 generates voltage command value Vo*, for example, by amplifying deviation ΔIm according to proportional control or proportional-integral control.

Adder 70 adds voltage command value Vo* and a detected value of AC output voltage Vo to generate a voltage command value Vo #.

PWM circuit 72 generates a PWM signal for controlling inverter 2 based on voltage command value Vo #. Gate circuit 74 generates a gate signal based on the generated PWM signal. The gate circuit outputs the generated gate signal to inverter 2. Turning on/off of a plurality of semiconductor switching elements (not shown) included in inverter 2 is controlled by the gate signal.

As has been described above, according to the present embodiment, since resistive elements 11 in the same number as the number of power modules PM operating in parallel are connected in parallel with respect to current detector CT that detects the output current of modular uninterruptible power supply apparatus U, control circuit 6 of each power module PM can detect shared current ID of power module PM based on the current flowing through resistive element 11.

This eliminates processing for calculating shared current ID by dividing a detected value of the output current of uninterruptible power supply apparatus U by the number of operating power modules PM. Therefore, there is no need to grasp the number of operating power modules PM, and thus a current which should be shared by operating power modules PM can be easily detected.

Further, in uninterruptible power supply system 100 in which the plurality of modular uninterruptible power supply apparatuses U are connected in parallel with respect to load 52 as shown in FIG. 1, since the plurality of current detectors CT provided respectively corresponding to the plurality of uninterruptible power supply apparatuses U are connected in parallel with each other, the number of resistive elements 11 connected in parallel is equal to the total sum of the numbers of operating power modules PM in respective uninterruptible power supply apparatuses U. Since currents equal to each other flow through resistive elements 11 connected in parallel, each control circuit 6 can detect shared current ID of power module PM based on the current flowing through corresponding resistive element 11. Hence, occurrence of variation in shared current ID between the plurality of uninterruptible power supply apparatuses U can be prevented.

For example, when operation of one of three power modules PM is stopped in uninterruptible power supply apparatus U1 as shown in FIG. 5, shared current ID of each of remaining two power modules PM and three power modules PM included in other uninterruptible power supply apparatus U2 is uniformly changed from IL/6 to IL/5, as the total sum of the numbers of operating power modules PM decreases from 6 to 5. Also in such a case where the numbers of power modules PM operating in parallel differ between uninterruptible power supply apparatuses U1 and U2, occurrence of variation in shared current ID between uninterruptible power supply apparatuses U1 and U2 can be prevented.

It should be noted that, in a case where shared current ID of power module PM is calculated by dividing load current IL by the number of operating power modules PM, it is necessary to constantly share information about the number of operating power modules PM between the plurality of uninterruptible power supply apparatuses U. Since the information becomes complicated as the number of uninterruptible power supply apparatuses U and/or the number of power modules PM included in each uninterruptible power supply apparatus U increases, there is a concern that it may become difficult to accurately calculate shared current ID.

In contrast, in the present embodiment, since control circuit 6 of power module PM set to the stopped state turns off switch S3 and also turns off switch S5, the currents flowing through resistive elements 11 connected in parallel change automatically. Therefore, control circuit 6 of operating power module PM can easily and accurately detect shared current ID based on the current flowing through resistive element 11.

It should be noted that, although the embodiment described above has described the configuration in which control circuit 9 of bypass module BM determines to which of the operating state and the stopped state each power module PM is to be set in modular uninterruptible power supply apparatus U, control circuit 6 of each power module PM may determine to which of the operating state and the stopped state that power module PM is to be set, by communicating with other control circuits 6.

Further, although the embodiment described above has described the uninterruptible power supply system including two—uninterruptible power supply apparatuses U each including three power modules PM, the number of power modules PM and the number of uninterruptible power supply apparatuses U are not limited thereto. It is needless to say that the present disclosure is applicable to an uninterruptible power supply system including any number of uninterruptible power supply apparatuses U including any number of power modules PM.

It should be understood that the embodiment disclosed herein is illustrative and non-restrictive in every respect. The present disclosure is defined by the scope of the claims, rather than the description above, and is intended to include any modifications within the scope and meaning equivalent to the scope of the claims.

REFERENCE SIGNS LIST

1: converter; 2: inverter; 3: bidirectional chopper; 4: DC line; 6, 9: control circuit; 7: processor; 8: memory; 10: secondary burden impedance; 11: resistive element; 20, 22, 24: parallel circuit; 50: control device; 51: AC power supply; 52: load; 60: switch control unit; 62: shared current detection unit; 64: output current computation unit; 66: subtracter; 68: current control unit; 70: adder; 72: PWM circuit; 74: gate circuit; 76: failure detection unit; 100: uninterruptible power supply system; B1, B2: battery; BM: bypass module; C1, C2, C3: capacitor; CT1, CT2, CT11, CT12: current detector; ID: shared current; IL: load current; L1, L2: reactor; PM1 to PM3: power modules; T1, T11, TI: input terminal; T3, T12, TO: output terminal; U1, U2: uninterruptible power supply apparatus.

The invention claimed is:

1. A modular uninterruptible power supply apparatus comprising:
    an input terminal that receives AC power supplied from an AC power supply;
    an output terminal connected to a load;
    a plurality of power conversion modules connected in parallel between the input terminal and the output terminal;
    a first current transformer that detects an AC current outputted from the output terminal; and
    a plurality of first control circuits provided respectively corresponding to the plurality of power conversion modules, wherein
    each of the power conversion modules includes
        a power converter,
        a first switch connected in series with the power converter between the input terminal and the output terminal,
        a resistive element, and
        a second switch that connects the resistive element and a secondary winding of the first current transformer in parallel in an ON state while the first switch is in the ON state,
    each of the first control circuits is configured to turn on the first switch and the second switch when setting a corresponding power conversion module to an operating state, and to turn off the first switch and the second switch when setting the power conversion module to a stopped state, and
    each of the first control circuits detects a shared current of the corresponding power conversion module based on a current flowing through the resistive element when the second switch is in the ON state, and controls the power converter such that an output current of the power conversion module matches the shared current.

2. The modular uninterruptible power supply apparatus according to claim 1, wherein
    the first current detector includes a current transformer, and
    the second switch connects the current transformer and the resistive element in parallel in the ON state.

3. The modular uninterruptible power supply apparatus according to claim 1, further comprising a second control circuit that determines to which of the operating state and the stopped state each of the power conversion modules is to be set, wherein
    each of the first control circuits operates the corresponding power conversion module when the second control circuit determines to set the corresponding power conversion module to the operating state, and stops operation of the corresponding power conversion module when the second control circuit determines to set the corresponding power conversion module to the stopped state.

4. The modular uninterruptible power supply apparatus according to claim 1, wherein
    the power converter includes
        a converter that converts the AC power inputted to the input terminal into DC power, and
        an inverter that converts the DC power generated by the converter or DC power of a power storage device into AC power, and
    each of the first control circuits controls the inverter such that the output current of the corresponding power conversion module matches the shared current.

5. The modular uninterruptible power supply apparatus according to claim 4, wherein
    the power converter further includes
        a reactor having a first terminal connected to an output node of the inverter, and a second terminal connected to the output terminal via the first switch, and
        a capacitor connected to the second terminal of the reactor,
    each of the power conversion modules further includes a second current transformer that detects an output current of the inverter, and
    each of the first control circuits calculates the output current of the corresponding power conversion module, based on a detected value of the second current transformer, an AC output voltage appearing at the output terminal, and a capacity of the capacitor.

6. An uninterruptible power supply system comprising:
    a plurality of uninterruptible power supply apparatuses connected in parallel with respect to the load, wherein
    each of the uninterruptible power supply apparatuses includes the modular uninterruptible power supply apparatus according to claim 1, and
    a plurality of first current transformers including the first current transformer provided respectively corresponding to the plurality of uninterruptible power supply apparatuses are connected in parallel with each other.

7. The uninterruptible power supply system according to claim 6, further comprising:
    a plurality of third switches that are provided respectively corresponding to the plurality of uninterruptible power supply apparatuses, and that connect the output terminals of the corresponding uninterruptible power supply apparatuses to the load in the ON state; and
    a control device configured to turn on a third switch corresponding to an uninterruptible power supply apparatus in the operating state, and turn off a third switch corresponding to an uninterruptible power supply apparatus in the stopped state, wherein
    each of the uninterruptible power supply apparatuses further includes a fourth switch that connects the first current transformer in parallel to the first current transformer of another uninterruptible power supply apparatus in the ON state, and
    the fourth switch is turned on when the third switch is in the ON state, and is turned off when the third switch is in an OFF state.

\* \* \* \* \*